United States Patent
Nishio et al.

(10) Patent No.: US 11,473,164 B2
(45) Date of Patent: Oct. 18, 2022

(54) HIGH-STRENGTH COLD-ROLLED STEEL SHEET AND MANUFACTURING METHOD THEREFOR

(71) Applicant: NIPPON STEEL CORPORATION, Tokyo (JP)

(72) Inventors: Takuya Nishio, Tokyo (JP); Kojiro Akiba, Tokyo (JP); Yoshimasa Narita, Tokyo (JP); Kotaro Ohno, Tokyo (JP); Satoshi Kato, Tokyo (JP); Masafumi Azuma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 3 days.

(21) Appl. No.: 16/981,160

(22) PCT Filed: Mar. 19, 2019

(86) PCT No.: PCT/JP2019/011486
§ 371 (c)(1),
(2) Date: Sep. 15, 2020

(87) PCT Pub. No.: WO2019/181950
PCT Pub. Date: Sep. 26, 2019

(65) Prior Publication Data
US 2021/0062288 A1   Mar. 4, 2021

(30) Foreign Application Priority Data
Mar. 19, 2018   (JP) .............................. JP2018-051020

(51) Int. Cl.
B32B 15/01   (2006.01)
C21D 6/00   (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01);
(Continued)

(58) Field of Classification Search
CPC ........ C21D 6/002; C21D 6/005; C21D 6/008; C21D 9/46; C21D 8/0205; C21D 8/0226;
(Continued)

(56) References Cited

U.S. PATENT DOCUMENTS

2008/0000555 A1   1/2008   Nonaka et al.
2012/0152411 A1   6/2012   Morimoto et al.
(Continued)

FOREIGN PATENT DOCUMENTS

CN   102482753 A   5/2012
JP   2006-104532 A   4/2006
(Continued)

OTHER PUBLICATIONS

"Metallic materials—Tensile testing—Method of test at room temperature", JIS Z 2241, 2011, total 37 pages.
(Continued)

*Primary Examiner* — Michael E. La Villa
(74) *Attorney, Agent, or Firm* — Birch, Stewart, Kolasch & Birch, LLP (57) ABSTRACT

This high-strength cold-rolled steel sheet has a predetermined chemical composition, wherein a microstructure at a ¼ position of a sheet thickness from a surface includes predetermined ranges of volume percentages of tempered martensite, residual austenite, ferrite and bainite, and martensite, wherein a microstructure at a position 25 μm from the surface includes, predetermined ranges of volume percentage of ferrite and bainite, and martensite and tempered martensite, wherein in the position 25 μm from the surface,
(Continued)

an average grain size of the martensite and the tempered martensite is 5.0 μm or less, a tensile strength is 1,310 MPa or more, and a uniform elongation is 5.0% or more, and R/t is 5.0 or less, the R/t being a ratio of a limit bend radius R in 90° V-bending to a sheet thickness t.

12 Claims, 2 Drawing Sheets

(51) Int. Cl.
| | |
|---|---|
| C21D 8/02 | (2006.01) |
| C21D 9/46 | (2006.01) |
| C22C 38/38 | (2006.01) |
| C22C 38/32 | (2006.01) |
| C22C 38/22 | (2006.01) |
| C22C 38/14 | (2006.01) |
| C22C 38/06 | (2006.01) |
| C22C 38/02 | (2006.01) |
| C22C 38/00 | (2006.01) |
| C23C 2/40 | (2006.01) |
| C22C 38/04 | (2006.01) |
| C22C 38/24 | (2006.01) |
| C23C 2/06 | (2006.01) |
| B32B 15/04 | (2006.01) |
| C23C 30/00 | (2006.01) |
| C23C 28/02 | (2006.01) |
| B32B 15/18 | (2006.01) |
| C23C 2/28 | (2006.01) |
| C23C 28/00 | (2006.01) |
| C22C 38/18 | (2006.01) |
| C22C 38/48 | (2006.01) |
| C22C 38/26 | (2006.01) |
| C22C 38/28 | (2006.01) |
| C22C 38/44 | (2006.01) |
| C22C 38/54 | (2006.01) |
| C22C 38/50 | (2006.01) |
| C22C 38/12 | (2006.01) |
| C22C 38/46 | (2006.01) |
| C21D 1/19 | (2006.01) |
| C21D 1/22 | (2006.01) |
| C21D 1/76 | (2006.01) |

(52) U.S. Cl.
CPC ............ *B32B 15/18* (2013.01); *C21D 1/19* (2013.01); *C21D 1/22* (2013.01); *C21D 1/76* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/44* (2013.01); *C22C 38/46* (2013.01); *C22C 38/48* (2013.01); *C22C 38/50* (2013.01); *C22C 38/54* (2013.01); *C23C 2/06* (2013.01); *C23C 2/28* (2013.01); *C23C 2/40* (2013.01); *C23C 28/025* (2013.01); *C23C 28/3225* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *Y10T 428/12799* (2015.01); *Y10T 428/12951* (2015.01); *Y10T 428/12958* (2015.01); *Y10T 428/12972* (2015.01)

(58) Field of Classification Search
CPC .. C21D 8/0236; C21D 8/0247; C21D 8/0273; C21D 2211/001; C21D 2211/002; C21D 2211/005; C21D 2211/008; C21D 1/19; C21D 1/22; C21D 1/76; B32B 15/013; B32B 15/04; B32B 15/043; B32B 15/18; C23C 28/025; C23C 28/3225; C23C 2/06; C23C 2/40; C23C 2/28; C23C 30/00; C23C 30/005; C22C 38/001; C22C 38/002; C22C 38/02; C22C 38/04; C22C 38/06; C22C 38/14; C22C 38/22; C22C 38/24; C22C 38/32; C22C 38/38; C22C 38/12; C22C 38/18; C22C 38/26; C22C 38/28; C22C 38/44; C22C 38/46; C22C 38/48; C22C 38/50; C22C 38/54; Y10T 428/12799; Y10T 428/12951; Y10T 428/12958; Y10T 428/12972

See application file for complete search history.

(56) References Cited

U.S. PATENT DOCUMENTS

| | | | |
|---|---|---|---|
| 2016/0168656 A1* | 6/2016 | Kawabe | ............... C21D 8/0205 |
| | | | 148/330 |
| 2018/0202016 A1 | 7/2018 | Yokoyama et al. | |
| 2019/0071744 A1 | 3/2019 | Hasegawa et al. | |

FOREIGN PATENT DOCUMENTS

| | | |
|---|---|---|
| JP | 2009-30091 A | 2/2009 |
| JP | 2010-215958 A | 9/2010 |
| JP | 2017-2384 A | 1/2017 |
| TW | 201804005 A | 2/2018 |
| WO | WO 2017/002883 A1 | 1/2017 |
| WO | WO 2017/168962 A1 | 10/2017 |

OTHER PUBLICATIONS

"Steels-Micrographic determination of the apparent grain size", JIS G 0551, 2013, total 6 pages.

\* cited by examiner

HIGH-STRENGTH COLD-ROLLED STEEL SHEET AND MANUFACTURING METHOD THEREFOR

TECHNICAL FIELD OF THE INVENTION

The present invention relates to a high-strength cold-rolled steel sheet and a manufacturing method therefor.

The present application claims priority based on Japanese Patent Application No. 2018-051020 filed in Japan on Mar. 19, 2018, the content of which is incorporated herein.

RELATED ART

Today, the industrial technology fields have been highly specialized, and materials used in each technology field demand special and highly sophisticated performance. Particularly, with respect to steel sheets for a vehicle, from consideration for the global environment, the demand for thin high-strength steel sheets having high formability is significantly increasing in order to reduce the weight of a vehicle body and improve the gas mileage. Among steel sheets for a vehicle, particularly, with respect to cold-rolled steel sheets (including plated steel sheets such as hot-dip galvanized steel sheets and galvannealed steel sheets) used for vehicle body frame components, not only a high strength, but also high formability for the additional broadening of the applications are required. Furthermore, high-strengthening also leads to the intensifying concern of hydrogen embrittlement. Therefore, with respect to high-strength strength steel sheets, in addition to a high strength and favorable forming workability, hydrogen embrittlement resistance after forming is required. For example, high-strength steel sheets demand that the tensile strength (TS) is 1,310 MPa or more, the uniform elongation in the tensile test is 5.0% or more, the ratio (R/t) of the limit bend radius R in 90° V-bending to the sheet thickness t is 5.0 or less, and, furthermore, the hydrogen embrittlement resistance is excellent.

A microstructure including ferrite is effective for obtaining excellent forming workability. However, ferrite is a soft microstructure and only slightly contributes to the strength improvement. Therefore, in order to obtain a strength of 1,310 MPa or more in steel having a microstructure including ferrite, it is necessary to harden the second phase. However, the hard second phase deteriorates the bendability.

For example, Patent Documents 1 and 2 propose, as a technique for increasing the tensile strength without deteriorating the bendability, steel sheets including tempered martensite as the primary phase. Patent Documents 1 and 2 disclose that the bendability is excellent when a single phase of tempered martensite is provided as the microstructure. In addition, it is disclosed that this tempered martensite is a microstructure in which a carbide, which is a hydrogen trap site, is finely dispersed and is thus also excellent in terms of the hydrogen embrittlement resistance.

However, the strength level of the invention of Patent Document 1 is as low as less than 1,310 MPa. Therefore, in the case of intending additional high-strengthening, it is necessary to further improve the hydrogen embrittlement resistance or the workability, which deteriorates as the strength increases. In addition, the invention of Patent Document 2 has a problem in that the steel sheet is directly cooled to near room temperature during cooling for quenching, and thus the amount of residual austenite is small, and high uniform elongation cannot be obtained (the formability is low).

In addition, as a technique for achieving both a high strength and high formability, Patent Document 3 proposes a steel sheet using the TRIP effect of residual austenite. However, the invention of Patent Document 3 has ferrite. Therefore, it is difficult to obtain a high strength of 1,310 MPa or more. In addition, there is a difference in strength in the microstructure, and thus it is demanded to further improve the bending formability.

PRIOR ART DOCUMENT

Patent Document

[Patent Document 1] Japanese Unexamined Patent Application, First Publication No. 2009-30091

[Patent Document 2] Japanese Unexamined Patent Application, First Publication No. 2010-215958

[Patent Document 3] Japanese Unexamined Patent Application, First Publication No. 2006-104532

DISCLOSURE OF THE INVENTION

Problems to be Solved by the Invention

As described above, in the related art, there have been no proposals for steel sheets having a high strength, which is a tensile strength (TS) of 1,310 MPa or more, high formability, and favorable hydrogen embrittlement resistance.

The present invention has been made to solve the above-described problems, and an object of the present invention is to provide a high-strength steel sheet that achieves both the formability and the hydrogen embrittlement resistance, which are problems for high-strength steel sheets, on a high level, that is, a high-strength cold-rolled steel sheet in which the tensile strength (TS) is 1,310 MPa or more, the uniform elongation is 5.0% or more, the ratio (R/t) of the limit bend radius R in 90 V-bending to the sheet thickness is 5.0 or less, and, furthermore, the hydrogen embrittlement resistance is excellent and a manufacturing method therefor.

In the present invention, the high-strength cold-rolled steel sheet includes a high-strength hot-dip galvanized steel sheet and a high-strength galvannealed steel sheet having a hot-dip galvanized layer or a hot-dip galvannealed layer on the surface.

Means for Solving the Problem

The present inventors carried out detailed investigations regarding the influences of the chemical composition and the manufacturing conditions on the mechanical properties of high-strength cold-rolled steel sheets. As a result, it was found that, when a microstructure which includes tempered martensite mainly and includes residual austenite is provided as the microstructure (metallographic structure) at a ¼ position of the sheet thickness from the surface, which is a typical position of a steel sheet, and then the surface layer is softened and the hard phase in the surface layer area is refined by controlling the dew point during annealing, it is possible to achieve formability and hydrogen embrittlement resistance, which are problems for high-strength steel sheets, on a high level. In addition, it was found that, in the surface layer area, when ferritic transformation or bainitic transformation is caused only in the surface layer by adjusting the retention time in a temperature range of higher than 425° C. and lower than 600° C. during cooling after annealing, it is possible to obtain the above-described microstructure.

The present invention has been made based on the above-described finding. The gist of the present invention is as described below.

(1) A high-strength cold-rolled steel sheet according to one aspect of the present invention is a high-strength cold-rolled steel sheet having a chemical composition containing, by mass %, C: more than 0.140% and less than 0.400%, Si: more than 0.35% and less than 1.50%, Mn: more than 1.50% and less than 4.00%, P: 0.100% or less, S: 0.010% or less, Al: 0.100% or less, N: 0.0100% or less, TI: 0% or more and less than 0.050%, Nb: 0% or more and less than 0.050%, V: 0% or more and 0.50% or less, Cr: 0% or more and 1.00% or less, Mo: 0% or more and 0.50% or less, B: 0% or more and 0.0100% or less, Ca: 0% or more and 0.0100% or less, Mg: 0% or more and 0.0100% or less, REM: 0% or more and 0.0500% or less, Bi: 0% or more and 0.050% or less with a remainder of Fe and impurities, in which a microstructure at a ¼ position of a sheet thickness from a surface includes, by a volume percentage, 70.0% or more of tempered martensite, more than 3.0% and less than 10.0% of residual austenite, a total of 25.0% or less of ferrite and bainite, and 5.0% or less of martensite, a microstructure at a position 25 μm from the surface includes, by the volume percentage, a total of 70% or more of ferrite and bainite and a total of 30% or less of martensite and tempered martensite, at the position 25 μm from the surface, an average grain size of the martensite and the tempered martensite is 5.0 μm or less, a tensile strength is 1,310 MPa or more, a uniform elongation is 5.0% or more, and R/t is 5.0 or less, the R/t being a ratio of a limit bend radius R in 90° V-bending to a sheet thickness t.

(2) In the high-strength cold-rolled steel sheet according to the (1), the chemical composition may contain, by mass %, one or more of Ti: 0.001% or more and less than 0.050%, Nb: 0.001% or more and less than 0.050%, V: 0.01% or more and 0.50% or less, Cr: 0.01% or more and 1.00% or less, Mo: 0.01% or more and 0.50% or less, B: 0.0001% or more and 0.0100% or less, Ca: 0.0001% or more and 0.0100% or less, Mg: 0.0001% or more and 0.0100% or less, REM: 0.005% or more and 0.0500% or less, and Bi: 0.005% or more and 0.050% or less.

(3) The high-strength cold-rolled steel sheet according to the (1) or (2) may include a hot-dip galvanized layer on the surface.

(4) In the high-strength cold-rolled steel sheet according to the (3), the hot-dip galvanized layer may be a hot-dip galvannealed layer.

(5) A manufacturing method for a high-strength cold-rolled steel sheet according to another aspect of the present invention is a manufacturing method for a high-strength cold-rolled steel sheet, including: a hot rolling step of directly heating or cooling and then heating a cast slab having a chemical composition containing, by mass %, C: more than 0.140% and less than 0.400%, Si: more than 0.35% and less than 1.50%, Mn: more than 1.50% and less than 4.00%, P: 0.100% or less, S: 0.010% or less, Al: 0.100% or less and N: 0.0100% or less, Ti: 0% or more and less than 0.050%, Nb: 0% or more and less than 0.050%, V: 0% or more and 0.50% or less, Cr: 0% or more and 1.00% or less, Mo: 0% or more and 0.50% or less. B: 0% or more and 0.0100% or less, Ca: 0% or more and 0.0100% or less. Mg: 0% or more and 0.0100% or less, REM: 0% or more and 0.0500% or less, Bi: 0% or more and 0.050% or less with a remainder of Fe and impurities and hot-rolling the cast slab to produce a hot-rolled steel sheet; a cold rolling step of pickling and cold rolling the hot-rolled steel sheet to obtain a cold-rolled steel sheet; an annealing step of carrying out annealing by soaking the cold-rolled steel sheet in an atmosphere having a dew point of −20° C. or higher and 20° C. or lower and containing nitrogen and 1.0 vol % or more and 20 vol % or less of hydrogen at a temperature of 800° C. or higher; a first cooling step of cooling the cold-rolled steel sheet to a temperature range of higher than 425° C. and lower than 600° C. after the annealing step; a holding step of retaining the cold-rolled steel sheet in a temperature range of higher than 425° C. and lower than 600° C. for 250 seconds or longer and 750 seconds or shorter after the first cooling step; a second cooling step of cooling the cold-rolled steel sheet to a temperature of 50° C. or higher and 250° C. or lower after the holding step; a tempering step of tempering the cold-rolled steel sheet at a temperature of 250° C. or higher and 350° C. or lower for one second or longer after the second cooling step; a third cooling step of cooling the cold-rolled steel sheet to a temperature at which skin pass rolling is possible after the tempering step; and a skin pass step of carrying out skin pass rolling on the cold-rolled steel sheet after the third cooling step.

(6) In the high-strength cold-rolled steel sheet according to the (5), wherein the chemical composition may contain, by mass %, one or more of Ti: 0.001% or more and less than 0.050%, Nb: 0.001% or more and less than 0.050%. V: 0.01% or more and 0.50% or less, Cr: 0.01% or more and 1.00% or less, Mo: 0.01% or more and 0.50% or less. B: 0.0001% or more and 0.0100% or less, Ca: 0.0001% or more and 0.0100% or less, Mg: 0.0001% or more and 0.0100% or less, REM: 0.005% or more and 0.0500% or less, and Bi: 0.005% or more and 0.050% or less.

(7) In the manufacturing method for a high-strength cold-rolled steel sheet according to the (5) or (6), the holding step may include a hot-dip galvanizing step in which hot-dip galvanizing is carried out on the cold-rolled steel sheet.

(8) The manufacturing method for a high-strength cold-rolled steel sheet according to the (7) may include an alloying step of carrying out an alloying treatment after the hot-dip galvanizing step in the holding step.

Effects of the Invention

According to the above-described aspects of the invention, a high-strength cold-rolled steel sheet in which the tensile strength (TS) is 1,310 MPa or more, the uniform elongation is 5.0% or more, and the ratio (R/t) of the limit bend radius R in 90° V-bending to the sheet thickness t is 5.0 or less, and, furthermore, the hydrogen embrittlement resistance is excellent and a manufacturing method therefor can be obtained. Such a steel sheet has formability favorable enough to be applied to working such as press forming and is excellent in terms of the hydrogen embrittlement resistance, which is a problem in relation to high-strengthening. Therefore, the present invention is capable of contributing to solving the global environmental issue by reducing the vehicle body weights of vehicles and significantly contributes to industrial development.

EMBODIMENTS OF THE INVENTION

A high-strength cold-rolled steel sheet according to an embodiment of the present invention (hereinafter, referred to as the steel sheet according to the present embodiment in some cases) will be described.

Hereinafter, the metallographic structure and the chemical composition of the steel sheet according to the present embodiment and the conditions for rolling and annealing and the like in a manufacturing method capable of efficiently, stably, and economically manufacturing the steel sheet will be described in detail. The steel sheet according to the present embodiment includes not only a cold-rolled steel sheet having no plated layer on the surface, but also a hot-dip galvanized steel sheet having a hot-dip galvanizing formed on the surface or a galvannealed steel sheet having a hot-dip galvannealing formed on the surface, and the main conditions therefor are common to high-strength hot-dip galvanized steel sheets and high-strength galvannealed steel sheets.

1. Metallographic Structure

In the description of the metallographic structure of the steel sheet according to the present embodiment, the microstructural fraction will be represented by the volume percentage. Therefore, unless particularly otherwise described, "%" represents "vol %".

In the steel sheet (high-strength cold-rolled steel sheet, high-strength hot-dip galvanized steel sheet, or high-strength galvannealed steel sheet) according to the present embodiment, the microstructure at a position ¼ of the sheet thickness (¼ thickness) from the surface includes, by the volume percentage, 70.0% or more of tempered martensite, more than 3.0% and less than 10.0% of residual austenite, a total of 25.0% or less of ferrite and bainite, and 5.0% or less of martensite.

In addition, the microstructure at a position of 25 μm from the surface includes, by the volume percentage, a total of 70.0% or more of ferrite and bainite and a total of 30.0% or less of martensite and tempered martensite, and the average grain size of martensite and tempered martensite is 5.0 μm or less.

In the steel sheet according to the present embodiment, the microstructure at the ¼ position of the sheet thickness from the surface in the sheet thickness direction, at which a typical microstructure of the steel sheet is shown, is a microstructure mainly including tempered martensite, and the microstructure in the surface layer area at the position 25 μm from the surface in the sheet thickness direction is a microstructure mainly including ferrite and bainite. That is, in the steel sheet according to the present embodiment, a gradient microstructure in which the fractions in the microstructure differ at the ¼ position of the sheet thickness and at the surface layer area is formed. Such a gradient microstructure can be achieved by carrying out appropriate decarburization during heating for annealing and then ensuring an appropriate retention time during which ferritic or bainitic transformation occurs only in the surface layer during cooling for annealing. The detailed conditions will be described in detail in the description of manufacturing conditions.

[Regarding Microstructure at Position 25 μm from Surface (Surface Layer 25 μm Position)]

The present inventors carried out intensive studies to improve the hydrogen embrittlement resistance of high-strength steel sheets. As a result, it was found that the microstructure in the surface layer area has a significant influence on the hydrogen embrittlement resistance. Specifically, it was found that, at the position 25 μm from the surface of the steel sheet in the sheet thickness direction, when the volume percentage of ferrite and bainite is 70.0% or more in total, the volume percentage of martensite and tempered martensite is 30.0% or less in total, and, furthermore, the average grain size of the martensite and the tempered martensite is 5.0 μm or less, the hydrogen embrittlement resistance is excellent. The detailed mechanism of the hydrogen embrittlement resistance being improved by forming the above-described microstructure is not clear, but the following reason can be considered. That is, during the bending deformation as a pre-strained in a hydrogen embrittlement resistance evaluation, the distortion concentrates most on the surface of the steel sheet, but it is considered that, due to the fact that the surface of the steel sheet is soft and the fact that the hard phase in the surface layer area, which acts as the origin of cracking, is reduced and finely homogenized and the number of cracking origins decreases, hydrogen embrittlement is suppressed.

Figure 1A:
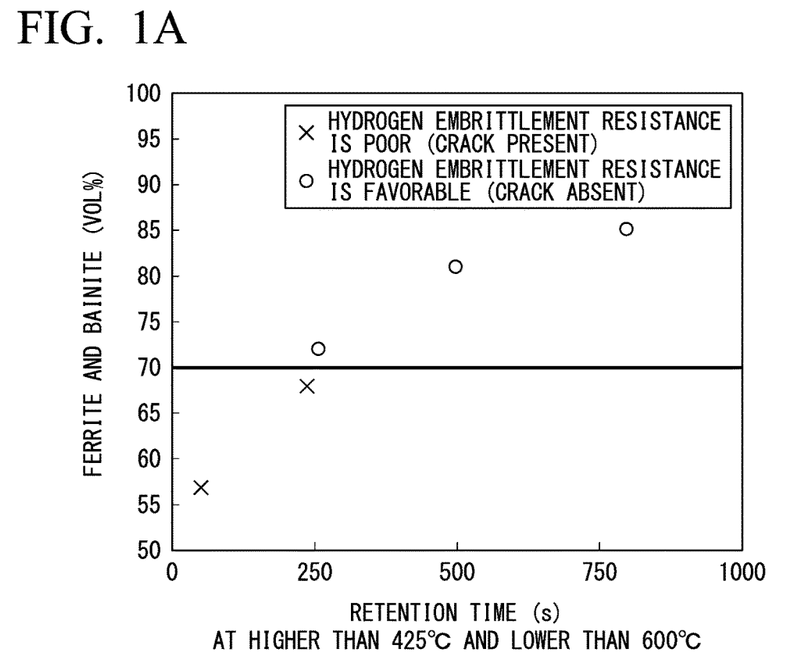
FIG. 1A is a graph showing a relationship between the retention time in a temperature range of higher than 425° C. and lower than 600° C. and the volume percentage of ferrite and bainite at a 25 μm depth position from the surface in the sheet thickness direction when a steel sheet is annealed, cooled, and then held in the temperature range and the hydrogen embrittlement resistance at that time.

As shown in FIG. 1A, when the volume percentage of ferrite and bainite is 70.0% or more in total at the position 25 μm from the surface, the hydrogen embrittlement resistance is excellent. The volume percentage of ferrite and bainite is preferably 75.0% or more and more preferably 80.0% or more. The volume percentage of ferrite and bainite may be 100%.

Figure 1B:
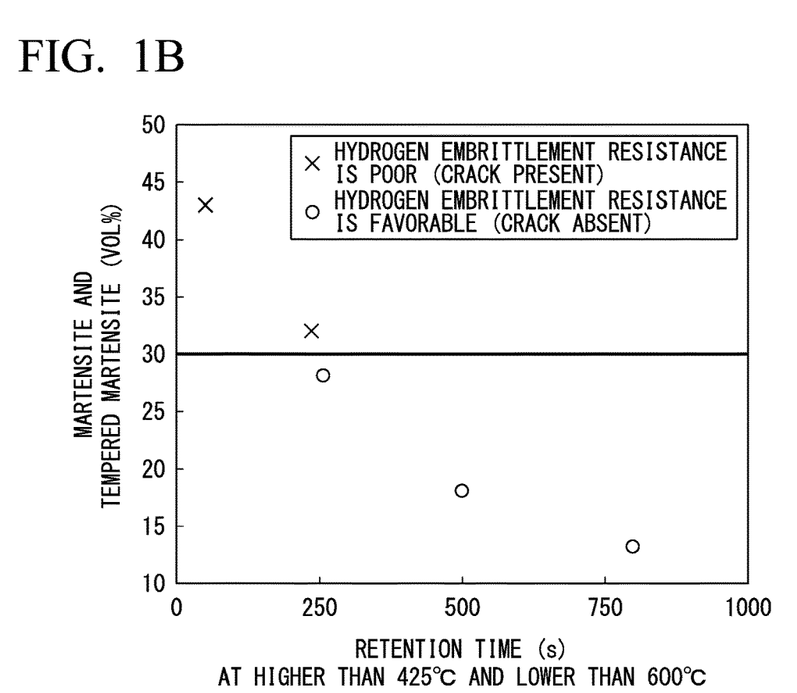
FIG. 1B is a graph showing a relationship between the retention time in a temperature range of higher than 425° C. and lower than 600° C. and the volume percentage of martensite and tempered martensite at the 25 μm depth position from the surface in the sheet thickness direction when the steel sheet is annealed, cooled, and then held in the temperature range and the hydrogen embrittlement resistance at that time.

In addition, hard martensite or tempered martensite in the microstructure of the surface layer area does not only harden the surface layer area but also increases the origin of cracking and thus deteriorates the hydrogen embrittlement resistance. That is, the martensite and the tempered martensite in the microstructure of the surface layer area need to be small and, furthermore, fine. Therefore, the volume percentage of the martensite and the tempered martensite is set to 30.0% or less at the position of 25 μm from the surface in the sheet thickness direction as shown in FIG. 1B. The volume percentage of the martensite and the tempered martensite is preferably 25.0% or less and more preferably 20.0% or less.

Figure 1C:
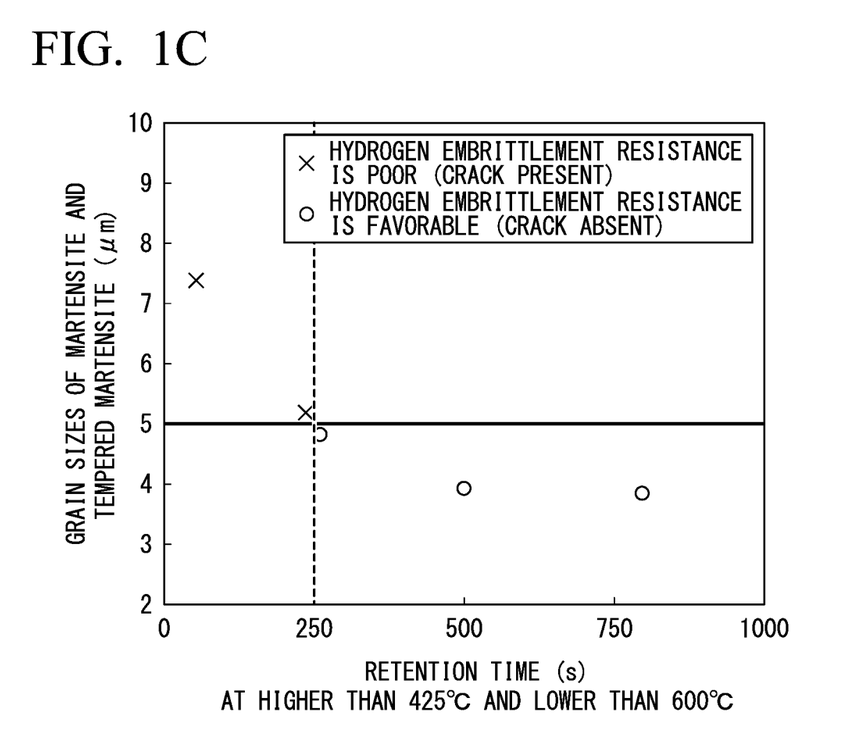
FIG. 1C is a graph showing a relationship between the retention time in a temperature range of higher than 425° C. and lower than 600° C. and the grain sizes of the martensite and the tempered martensite at the 25 μm depth position from the surface in the sheet thickness direction when the steel sheet is annealed, cooled, and then held in the temperature range and the hydrogen embrittlement resistance at that time.

In addition, as shown in FIG. 1C, the average grain size of the martensite and the tempered martensite is set to 5.0 μm or less. The average grain size of the martensite and the tempered martensite is preferably 4.5 μm or less and more preferably 4.0 μm or less.

[Regarding Microstructure at ¼ Position (¼ Thickness) of Sheet Thickness from Surface]

Tempered martensite is, similar to martensite (so-called fresh martensite), an aggregate of lath-shaped crystal grains, but is a hard microstructure including a fine iron-based carbide therein by tempering. Tempered martensite can be obtained by tempering martensite formed by cooling or the like after annealing through a heat treatment or the like.

Tempered martensite is a microstructure, which is not brittle and has ductility compared with martensite. In the steel sheet according to the present embodiment, the volume percentage of the tempered martensite is set to 70.0% or more in order to improve the strength and the bendability. The volume percentage is preferably 75.0% or more and more preferably 80.0% or more.

Residual austenite improves the ductility through the TRIP effect and contributes to the improvement of the uniform elongation (uniform elongation of 5.0% or more described below). Therefore, in the microstructure at the ¼ position of the sheet thickness from the surface in the sheet thickness direction, the volume percentage of the residual austenite is set to be more than 3.0%. The volume percentage of the residual austenite is preferably 3.5% and more preferably 4.0% or more.

On the other hand, when the volume percentage of the residual austenite becomes excessive, the grain size of the residual austenite becomes large, and the residual austenite turns into coarse and hard martensite after deformation. In this case, the origin of cracking is likely to be generated, and the bendability deteriorates. Therefore, the volume percentage of the residual austenite is set to be less than 10.0%. The volume percentage of the residual austenite is preferably less than 8.0% and more preferably less than 7.0%.

Ferrite is a soft phase obtained by annealing in a two-phase region or by slow cooling after annealing. In a case where ferrite and a hard phase such as martensite are present in a mixed form, the ductility of the steel sheet is improved. However, in order to achieve a high strength of 1,310 MPa or more, it is necessary to limit the volume percentage of the ferrite.

In addition, bainite is a phase obtained by holding steel at 350° C. or higher and 550° C. or lower for a certain period of time after annealing. Bainite is softer than martensite and thus has an effect on improving the ductility. However, in order to achieve a high strength of 1,310 MPa or more, similar to the ferrite, it is necessary to limit the volume percentage of the bainite.

Therefore, the volume percentage of the ferrite and the bainite is set to 25.0% or less in total. The volume percentage is preferably 15.0% or less and more preferably 10.0% or less.

Martensite (fresh martensite) is an aggregate of lath-shaped crystal grains, which is formed by transformation from austenite during final cooling. Martensite is hard and brittle. Therefore, martensite is likely to act as a cracking origin during deformation and deteriorates the bendability. Therefore, the volume percentage of the martensite is set to 5.0% or less. The volume percentage of the martensite is preferably 3.0 or less and more preferably 2.0% or less.

The microstructure at the ¼ position of the sheet thickness from the surface may include, in addition to the above-described phases, pearlite as the remainder in microstructure. However, pearlite is a microstructure having cementite in the microstructure and consumes C in steel, which contributes to the improvement of the strength. Therefore, when the volume percentage of the pearlite exceeds 5.0%, the strength of the steel sheet decreases. Therefore, the volume percentage of the pearlite is set to 5.0% or less. The volume percentage of the pearlite is preferably 3.0% or less and more preferably 1.0% or less.

The volume percentages in the microstructure at the position 25 μm from the surface and in the microstructure at the ¼ position of the sheet thickness from the surface of the steel sheet according to the present embodiment are measured as described below. That is, the volume percentages of the ferrite, the bainite, the martensite, the tempered martensite, and the pearlite are obtained by collecting test pieces from random positions in the rolling direction and in the width direction of the steel sheet, polishing the longitudinal sections parallel to the rolling direction, and observing the metallographic structures exposed by Nital etching at the position 25 μm from the surface of the steel sheet and at the ¼ position of the sheet thickness using SEM. In the SEM observation, five visual fields (30 μm×50 μm visual fields) are observed at a magnification of 3,000 times, the area ratios of each microstructure are measured from the observed images, and the average value thereof is calculated. Because there is no microstructural change in the direction perpendicular to the rolling direction (steel sheet width direction), and the area ratio of the longitudinal section parallel to the rolling direction is equal to the volume percentage, the area ratio is regarded as the volume percentage of each microstructure. In the measurement of the area ratio of each microstructure, a region that any sub-microstructure is not exposed and has low brightness is regarded as the ferrite. In addition, a region that sub-microstructure is not exposed and has high brightness is regarded as the martensite or the residual austenite. In addition, a region that exposes a sub-microstructure is regarded as the tempered martensite or the bainite.

The bainite and the tempered martensite can be differentiated by further observing an intragranular carbide carefully.

Specifically, the tempered martensite is constituted of martensite laths and cementite formed in the laths. At this time, there are two or more kinds of crystal orientation relationships between the martensite lath and the cementite, and thus the cementites constituting the tempered martensite have a plurality of variants. On the other hand, the bainite is classified into upper bainite and lower bainite. The upper bainite is constituted of lath-shaped bainitic ferrite and cementite formed in the lath interfaces, and thus the upper bainite can be easily differentiated from the tempered martensite. The lower bainite is constituted of lath-shaped bainitic ferrite and cementite formed in the laths. At this time, unlike the tempered martensite, there is one kind of crystal orientation relationship between the bainitic ferrite and the cementite, and thus the cementites constituting the lower bainite have the same variant. Therefore, the lower bainite and the tempered martensite can be differentiated based on the variant of the cementite.

On the other hand, the martensite cannot be differentiated from the residual austenite by SEM observation. Therefore, the volume percentage of the martensite is calculated by subtracting the volume percentage of the residual austenite calculated by a method described below from the area ratio of microstructures other than the ferrite, the bainite, the tempered martensite, and the pearlite.

However, in the surface layer area, the C concentration decreases due to decarburization, and thus the residual austenite is not formed. Therefore, in the surface layer area, a microstructure determined as martensite or residual austenite by SEM observation is determined as martensite without being differentiated from residual austenite.

In addition in the steel sheet according to the embodiment, at the surface layer 25 μm position, the ferrite and the bainite become dominant microstructures, and the martensite and the tempered martensite become hard microstructures compared with these microstructures.

Therefore, as the grain sizes of the martensite and the tempered martensite at the surface layer 25 μm position, the circle equivalent grain sizes of the martensite, the tempered martensite, or grains in which the martensite and the tempered martensite are present in a mixed form are calculated without differentiating the martensite and the tempered martensite.

Specifically, the average grain size of the martensite and the tempered martensite at the position 25 μm from the surface of the steel sheet according to the present embodiment is obtained by the following method.

Test pieces are collected from random positions in the rolling direction and in the width direction of the steel sheet, the longitudinal section parallel to the rolling direction is polished, and the metallographic structures exposed by Nital etching at the position 25 μm from the surface of the steel sheet and at the ¼ position of the sheet thickness are observed using SEM. For these microstructures, the circle-equivalent average size of the above-described microstructures determined as the martensite or the tempered martensite is calculated by the intercept method described in JIS G 0551 (2013) and is regarded as the average grain size of the martensite and the tempered martensite.

The volume percentage of the residual austenite is obtained as described below: a test piece is collected from a random position on the steel sheet, the rolled surface is chemically polished from the surface of the steel sheet to a position ¼ of the sheet thickness inward of the surface of the steel sheet, and the volume percentage is quantified from the integrated intensities of the (200) and (210) planes of the ferrite and the integrated intensities of the (200), (220), and (311) planes of the austenite by MoKα rays.

The volume percentage of the residual austenite at the position 25 μm from the surface can be measured by chemically polishing the rolled surface from the surface of the steel sheet to the position of 25 μm of the sheet thickness and using the same method as described above. However, as described above, in the surface layer area, the C concentration decreases due to decarburization, and thus the residual austenite is substantially not formed. Therefore, the volume percentage of the residual austenite at the position 25 μm from the surface may not be measured.

[Tensile Strength of 1.310 MPa or More and Uniform Elongation of 5.0% or More]

[Ratio (Rh) of Limit Bend Radius R in 90° V-Bending to Sheet Thickness t of 5.0 or Less]

In the steel sheet according to the present embodiment, as the strength that contributes to the weight reduction of vehicle bodies of vehicles, the tensile strength (TS) is set to 1,310 MPa or more. From the viewpoint of the impact absorption property, the strength of the steel sheet is preferably 1,400 MPa or more and more preferably 1,470 MPa or more.

In addition, from the viewpoint of the formability, the uniform elongation (uEl) is set to 5.0% or more. In order to further improve the formability, the uniform elongation (uEl) is more preferably 5.5% or more. In addition, from the viewpoint of the formability, the ratio (R/t) of the limit bend radius R in 90° V-bending to the sheet thickness t is set to 5.0 or less. In order to further improve the formability, the (R/t) is preferably 4.0 or less and more preferably 3.0 or less.

The tensile strength (TS) and the uniform elongation (uEl) are obtained by collecting a JIS No. 5 tensile test piece from the steel sheet in a direction perpendicular to the rolling direction and carrying out a tensile test according to JIS Z 2241 (2011).

In addition, the limit bend radius (R) is obtained by obtaining the minimum bending R, at which cracking does not occur, by changing the radius R at 0.5 mm pitches using a 90° V-bending die and dividing the minimum bending by the sheet thickness t.

2. Chemical Composition of Steel Sheet

Next, the chemical composition of the steel sheet according to the present embodiment will be described. Hereinafter, "%" indicating the amount of each element in the chemical composition means mass %.

C: More than 0.140% and less than 0.400%

When the C content is 0.140% or less, it becomes difficult to obtain the above-described metallographic structure, and it becomes impossible to achieve the above-described tensile strength. In addition, the ratio (R/t) of the limit bend radius R in 90° V-bending to the sheet thickness t is deteriorated. Therefore, the C content is set to be more than 0.140%. The C content is preferably more than 0.160% and more preferably more than 0.180%.

On the other hand, when the C content is 0.400% or more, the weldability deteriorates, and the ratio (R/t) of the limit bend radius R in 90° V-bending to the sheet thickness t deteriorates. In addition, the hydrogen embrittlement resistance also deteriorates. Therefore, the C content is set to be less than 0.400%. The C content is preferably less than 0.350% and more preferably less than 0.300%.

Si: More than 0.35% and less than 1.50%

Si is a useful element for increasing the strength of the steel sheet by solid solution strengthening. In addition, Si suppresses the formation of cementite and thus has an effect on promoting the concentration of C in austenite and is an essential element for forming residual austenite after annealing. When the Si content is 0.35% or less, it becomes difficult to obtain an effect of the above-described action, and it becomes difficult to achieve the uniform elongation. Therefore, the hydrogen embrittlement resistance deteriorates. Therefore, the Si content is set to be more than 0.35%. The Si content is preferably more than 0.40% and more preferably more than 0.45%.

On the other hand, when the Si content is 1.50% or more, austenite transformation during heating for annealing becomes slow, and there is a case where the ferrite does not sufficiently transform into austenite. In this case, the ferrite excessively remains in the microstructure after annealing, and it becomes impossible to achieve the target tensile strength. In addition, the ratio (R/t) of the limit bend radius R in 90° V-bending to the sheet thickness t deteriorates. In addition, when the Si content is 1.50% or more, the surface properties of the steel sheet deteriorate. Furthermore, the chemical convertibility and the plating property significantly deteriorate. Therefore, the Si content is set to be less than 1.50%. The Si content is preferably less than 1.25%, more preferably less than 1.00%, and still more preferably 0.90% or less or 0.85% or less. Particularly, when the Si content is set to be less than 1.00%, the plating adhesion improves.

Mn: More than 1.50% and less than 4.00%

Mn has an action of improving the hardenability of steel and is an effective element for obtaining the above-described metallographic structure. When the Mn content is 1.50% or less, it becomes difficult to obtain the above-described metallographic structure. In this case, it becomes impossible to achieve the tensile strength. Therefore, the Mn content is set to be more than 1.50%. The Mn content is preferably more than 1.75%, more preferably more than 2.00%, and still more preferably more than 2.25%.

On the other hand, when the Mn content is 4.00% or more, the bendability is impaired by the segregation of Mn. In addition, the ratio (Rh) of the limit bend radius R in 90° V-bending to the sheet thickness t deteriorates, and the hydrogen embrittlement resistance also deteriorates. Furthermore, the material cost is increased. Therefore, the Mn content is set to be less than 4.00%. The Mn content is preferably less than 3.50%, more preferably less than 3.20%, and still more preferably less than 3.00%.

P: 0.100% or less

P is an element contained in steel as an impurity and is an element that is segregated at grain boundaries and embrittles steel. Therefore, the P content is preferably small and may be 0%. However, in consideration of the time and cost for removing P, the P content is set to 0.100% or less. The P content is preferably 0.020% or less and more preferably 0.015% or less.

S: 0.010% or less

S is an element contained in steel as an impurity and forms a sulfide-based inclusion to deteriorate the bendability. Therefore, the S content is preferably small and may be 0%. However, in consideration of the time and cost for removing Si, the Si content is set to 0.010% or less. The S content is preferably 0.005% or less, more preferably 0.003% or less, and further preferably 0.001% or less.

Al: 0.100% or less

Al is an element having an action of deoxidizing molten steel. When Al is contained for the purpose of deoxidation, for reliable deoxidation, the Al content is preferably 0.005% or more and more preferably 0.010% or more. In addition, Al has, similar to Si, an action of enhancing the stability of austenite and is an effective element for obtaining the above-mentioned metallographic structure. Therefore. Al may be contained.

On the other hand, when the Al content is too high, not only is a surface defect attributed to alumina likely to be generated, but the transformation point significantly increases, and the volume percentage of the ferrite increases. In this case, it becomes difficult to obtain the above-described metallographic structure, and it becomes impossible to achieve the tensile strength. Therefore, the Al content is set to 0.100% or less. The Al content is preferably 0.050% or less, more preferably 0.040% or less, and still more preferably 0.030% or less. The steel sheet according to the present embodiment contains Si having, similar to Al, a deoxidizing action, and thus Al does not necessarily need to be contained, and the Al content may be 0%.

N: 0.0100% or less

N is an element contained in steel as an impurity and is an element that forms a coarse precipitate and deteriorates the bendability. Therefore, the N content is set to 0.0100% or less. The N content is preferably 0.0060% or less and more preferably 0.0050% or less. The N content is preferably small and may be 0%.

The steel sheet according to the present embodiment contains the above-described elements, the remainder may be Fe and impurities, and the steel sheet may further contain one or more kinds of elements listed below as optional elements. The elements have an influence on the strength and the bendability. However, these elements do not necessarily need to be contained, and thus the lower limits of the elements are all 0%.

Ti: less than 0.050%, Nb: less than 0.050%, V: 0.50% or less

Ti, Nb and V have an action of improving the strength of the steel sheet by precipitation hardening. Therefore, these elements may be contained. In order to sufficiently obtain the above-described effect, it is preferable that the lower limits of the Ti content and the Nb content are set to 0.001% and the lower limit of the V content is set to 0.01%. It is more preferable that the lower limits of the Ti content and the Nb content are set to 0.005% and the lower limit of the V content is set to 0.05%. It is not essential to obtain the above-described effect. Therefore, it is not necessary to particularly limit the lower limits of the Ti content, the Nb content, and the V content, and the lower limits thereof are 0%.

However, when these elements are excessively contained, the recrystallization temperature rises, the metallographic structure of the cold-rolled steel sheet becomes non-uniform, and the bendability is impaired.

Therefore, in a case where Ti, Nb, and V are contained, the Ti content is set to be less than 0.050%, the Nb content is set to be less than 0.050%, and the V content is set to 0.50% or less. The Ti content is preferably less than 0.030% and more preferably less than 0.020%. The Nb content is preferably less than 0.030% and more preferably less than 0.020%. The V content is preferably 0.30% or less.

Cr: 1.00% or less, Mo: 0.50% or less, B: 0.0100% or less

Cr, Mo and B have an action of improving the hardenability of steel and affecting the strength and are effective elements for obtaining the above-described metallographic structure. Therefore, these elements may be contained. In order to sufficiently obtain the above-described effect, it is preferable that the lower limits of the Cr content and the Mo content are set to 0.01% and the lower limit of the B content is set to 0.0001%. The more preferred lower limits are 0.05% for Cr and Mo and 0.0010% for B. It is not essential to obtain the above-described effect. Therefore, it is not necessary to particularly limit the lower limits of the Cr content, the Mo content, and the B content, and the lower limits thereof are 0%.

However, even when these elements are excessively contained, the effect of the above-described action is saturated, and thus it becomes uneconomical to excessively contain the elements. Therefore, in a case where Cr, Mo, and B are contained, the Cr content is set to 1.00% or less, the Mo content is set to 0.50% or less, and the B content is set to 0.0100% or less. The Cr content is preferably 0.50% or less, the Mo content is preferably 0.20% or less, and the B content is preferably 0.0030% or less.

Ca: 0.0100% or less, Mg: 0.0100% or less, REM: 0.0500% or less, and Bi: 0.050% or less.

All of Ca, Mg, REM, and Bi are elements having an action of improving the strength and the bendability. Ca, Mg, and REM improves the strength and the bendability by adjusting the shape of an inclusions, and Bi improves the strength and the bendability by refining the solidification structure. Therefore, these elements may be contained. In order to sufficiently obtain the above-described effect, it is preferable that the lower limits of the Ca content and the Mg content are set to 0.0001% and the lower limits of the REM content and the Bi content are set to 0.005%. The more preferred lower limits are 0.0008% for Ca and Mg and 0.0007% for REM and Bi. It is not essential to obtain the above-described effect. Therefore, it is not necessary to particularly limit the lower limits of the Ca content, the Mg content, the Sb content, the Zr content, and the REM content, and the lower limits thereof are 0%.

However, even when these elements are excessively contained, the effect of the above-described action is saturated, and it becomes uneconomical to excessively contain the elements. Therefore, in a case where Ca, Mg. REM, and Bi are contained, the Ca content is set to 0.0100% or less, the Mg content is set to 0.0100% or less, the REM content is set to 0.0500% or less, and the Bi content is set to 0.050% or less. It is preferable that the Ca content is 0.0020% or less, the Mg content is 0.0020% or less, the REM content is 0.0020% or less, and the Bi content is 0.010% or less. REM indicates rare earth elements and is a collective term of a total of 17 elements of Sc, Y, and lanthanoid. The REM content is the total amount of these elements.

The steel sheet according to the present embodiment may have a hot-dip galvanized layer on the surface. The plated layer provided on the surface improves the corrosion resistance. When a steel sheet for a vehicle has a concern of pitting by corrosion, there is a case where it is not possible to thin the steel sheet for a vehicle to a certain sheet thickness or less even after high-strengthening. Because one of the purposes of the high-strengthening of the steel sheet is weight reduction by thinning, when a developed high-strength steel sheet has poor corrosion resistance, regions to which the high-strength steel sheet can be applied are limited. As a method for solving this problem, it can be considered to carry out plating such as highly corrosion-resistant hot-dip galvanizing on the steel sheet. In the steel sheet according to the present embodiment, the steel sheet components are controlled as described above, and thus hot-dip galvanizing is possible.

The hot-dip galvanized layer may be a hot-dip galvannealed layer.

3. Manufacturing Conditions

As a result of studies by the present inventors, it was clarified that, when appropriate decarburization is carried out under predetermined atmospheric conditions during heating for annealing, and then an appropriate retention time is ensured during cooling for annealing, it is possible to achieve a gradient microstructure in which the microstructure at the ¼ position of the sheet thickness from the surface is a tempered martensite-dominant microstructure, the microstructure differs in the surface layer area and at the ¼ position of the sheet thickness from the surface, and the hydrogen embrittlement resistance is excellent. Hereinafter, the details will be described.

Specifically, the steel sheet according to the present embodiment can be manufactured by a manufacturing method including the following steps (I) to (IX).

(I) A hot rolling step of directly heating or cooling and then heating a cast slab having a predetermined chemical composition and hot-rolling the cast slab to produce a hot-rolled steel sheet, (II) a cold rolling step of pickling and cold rolling the hot-rolled steel sheet to obtain a cold-rolled steel sheet, (III) an annealing step of carrying out annealing by soaking the cold-rolled steel sheet in an atmosphere having a dew point of −20° C. or higher and 20° C. or lower and containing 1.0 vol % or more and 20 vol % or less of hydrogen and nitrogen at a temperature of 800° C. or higher, (IV) a first cooling step of cooling the cold-rolled steel sheet to a temperature range of higher than 425° C. and lower than 600° C. after the annealing, (V) a holding step of retaining the cold-rolled steel sheet in a temperature range of higher than 425° C. and lower than 600° C. for 250 seconds or longer and 750 seconds or shorter after the first cooling step, (VI) a second cooling step of cooling the cold-rolled steel sheet to a temperature of 50° C. or higher and 250° C. or lower after the holding step (VII) a tempering step of tempering the cold-rolled steel sheet at a temperature of 250° C. or higher and 350° C. or lower for one second or longer after the second cooling step, (VIII) a third cooling step of cooling the cold-rolled steel sheet to a temperature at which skin pass rolling is possible after the tempering step, and (IX) a skin pass step of carrying out skin pass rolling on the cold-rolled steel sheet after the third cooling step.

Hereinafter, each step will be described.

[Hot Rolling Step]

In the hot rolling step, a cast slab having the above-described chemical composition is heated and hot-rolled to produce a hot-rolled steel sheet. In a case where the temperature of the cast slab is high, the cast slab may be directly subjected to hot rolling without being cooled once to near room temperature.

The hot rolling conditions are not limited, but it is preferable to heat the cast slab to 1,100° C. or higher and carry out hot rolling such that the finish rolling outlet temperature becomes the Ar3 transformation point or higher. When the heating temperature is lower than 1,100° C., it is likely that the homogenization of the material becomes insufficient. In addition, when the finish rolling outlet temperature is lower than the Ar3 transformation point, a deformed ferrite microstructure remains. Therefore, the microstructure becomes non-uniform, the microstructure after annealing does not become uniform, and the bendability is likely to be deteriorated.

The hot rolled steel sheet after the hot rolling may be coiled in a coil shape. The coiling temperature is not particularly limited. However, when the coiling temperature exceeds 650° C., the microstructure of the hot-rolled steel sheet becomes a coarse ferrite-pearlite microstructure, the metallographic structure of the steel sheet after annealing becomes non-uniform, and the bendability deteriorates. Therefore, the upper limit of the coiling temperature is preferably 650° C. or lower. The coiling temperature is preferably 600° C. or lower and more preferably 580° C. or lower. On the other hand, when the coiling temperature is lower than 500° C., the strength of the hot-rolled steel sheet increases, and the load during cold rolling becomes high. Therefore, the coiling temperature is preferably 500° C. or higher. In a case where the strength of the hot-rolled steel sheet is high, a softening heat treatment such as BAF may be carried out before cold rolling.

[Cold Rolling Step]

In the cold rolling step, the hot-rolled steel sheet that has been hot-rolled is descaled by pickling or the like and then cold-rolled to obtain a cold rolled steel sheet. The cold rolling (cold rolling) conditions are not particularly limited. However, when the metallographic structure after cold rolling and annealing is uniformed by promoting recrystallization, the bendability improves. Therefore, the cold rolling reduction (cumulative rolling reduction) is preferably set to 40% or more. The cold rolling reduction is preferably 45% or more and more preferably 50% or more.

When the cold rolling reduction is too high, the rolling load increases, and the rolling becomes difficult. Therefore, the cold rolling reduction is preferably less than 70%. The cold rolling reduction is preferably less than 65% and more preferably less than 60%.

[Annealing Step]

The steel sheet after the cold rolling step is annealed after a treatment such as degreasing is carried out thereon according to a well-known method as necessary.

The steel sheet according to the present embodiment contains Si. Therefore, from the viewpoint of the chemical convertibility or the plating adhesion of the steel sheet, the atmosphere in the furnace is controlled during heating for annealing in order to internally oxidize Si and Mn. Specifically, the atmosphere in the furnace (heating zone and soaking zone) is set to a nitrogen-hydrogen mixed atmosphere in which the dew point is −20° C. or higher and 20° C. or lower, 1.0 vol % or more and 20 vol % or less of hydrogen is contained, and the remainder is nitrogen and an impurity. The atmosphere is appropriately adjusted within this range depending on the composition of the steel sheet or the manufacturing conditions. When the steel sheet is annealed in this atmosphere, appropriate decarburization occurs in the surface layer area of the steel sheet. Therefore, the adjustment of the cooling conditions after the annealing enables the obtainment of a gradient microstructure in which, as described above, the volume percentages in the microstructure at the ¼ position from the surface and the volume percentages in the microstructure in the surface layer area differ from each other. That is, in the surface layer in which the C content is small due to decarburization, ferritic transformation and bainitic transformation occurs prior to the beginning of transformation in the central part having a large C content, and thus only the surface layer area becomes soft. When this gradient microstructure and this microstructure configuration at the predetermined positions are obtained, it becomes possible to achieve both the formability and the hydrogen embrittlement resistance on a high level.

Generally, as the Si content increases, the occurrence of decarburization becomes easier. However, in the steel sheet according to the present embodiment, the upper limit of the Si content is limited in consideration of the plating adhesion or the like. Therefore, in the chemical composition of the steel sheet according to the present embodiment, a preferred microstructure cannot be obtained in the surface layer area unless the temperature history after annealing is controlled.

In addition, the soaking temperature in the annealing step is set to 800° C. or higher. When the soaking temperature is lower than 800° C., the volume percentage of the ferrite at the ¼ position from the surface increases, and the proportion of the tempered martensite becomes insufficient. Therefore, it becomes difficult to ensure the strength and the ratio (R/t) of the limit bend radius R in 90 V-bending to the sheet thickness t. The soaking temperature is preferably 820° C. or higher and more preferably 840° C. or higher. As the soaking temperature increases, it becomes easier to ensure the strength. However, when the soaking temperature is too high, the manufacturing cost increases, and thus the soaking temperature is preferably 900° C. or lower. The soaking temperature is more preferably 880° C. or lower and still more preferably 870° C. or lower.

The soaking time is preferably 30 to 450 seconds. When the soaking time is shorter than 30 seconds, austenitizing does not proceed sufficiently, and thus the soaking time is preferably 30 seconds or longer. On the other hand, when the soaking time exceeds 450 seconds, the productivity degrades, and thus the soaking time is preferably 450 seconds or shorter.

In the heating step which is carried out prior to the soaking step in the annealing step, in order to homogenize the metallographic structure after the annealing and improve the bendability by promoting recrystallization and to soften the surface of the steel sheet and improve the hydrogen embrittlement resistance by promoting the decarburization of the surface layer, the heating speed from 700° C. to the soaking temperature is preferably set to slower than 10.0° C./s. The heating speed is more preferably set to slower than 8.0° C./s and more preferably set to slower than 5.0° C./s.

[First Cooling Step]
[Holding Step]

In order to obtain the above-described gradient microstructure, the annealed cold-rolled steel sheet is cooled to a temperature range of higher than 425° C. and lower than 600° C. (first cooling step) and is held in this temperature range (higher than 425° C. and lower than 600° C.) for the retention time of 250 seconds or longer and 750 seconds or shorter (holding step). When the cooling stop temperature and the subsequent holding temperature are 425° C. or lower, the volume percentage of the bainite at the ¼ position of the sheet thickness from the surface of the steel sheet increases, and the volume percentage of the tempered martensite decreases. As a result, the tensile strength decreases, and the ratio (R/t) of the limit bend radius R in 90° V-bending to the sheet thickness t deteriorates. In the present embodiment, the strength is ensured by the presence of sufficient tempered martensite at the ¼ position of the sheet thickness from the surface of the steel sheet. A sufficient strength cannot be obtained with bainite.

On the other hand, when the cooling stop temperature and the subsequent holding temperature are 600° C. or higher, the ferrite fraction increases in the center portion of the steel sheet, and the volume percentage of the tempered martensite decreases. As a result, the tensile strength decreases, and the ratio (R/t) of the limit bend radius R in 90° V-bending to the sheet thickness t deteriorates. In addition, ferritic transformation and bainitic transformation do not proceed in the surface layer area of the steel sheet, and it becomes impossible to obtain the above-described surface layer microstructure. Therefore, the hydrogen embrittlement resistance deteriorates.

Therefore, the cooling stop temperature and the holding temperature are set to higher than 425° C. and lower than 600° C. The holding temperature is preferably higher than 440° C. and lower than 580° C. and more preferably higher than 450° C. and lower than 560° C. Within this temperature range, the temperature may be changed during the retention time.

In the first cooling step, the cold-rolled steel sheet is preferably cooled at an average cooling rate of 5° C./s or faster in order to suppress ferritic transformation during cooling. The average cooling rate is more preferably 10° C./s or faster.

FIG. 1A shows the relationship between the volume percentage of the ferrite and the bainite at the 25 μm depth position from the surface of the steel sheet (surface layer area) and the retention time at higher than 425° C. and lower than 600° C. FIG. 1B shows the relationship between the volume percentage of the martensite and the tempered martensite at the 25 μm depth position from the surface of the steel sheet (surface layer area) and the retention time at higher than 425° C. and lower than 600° C. FIG. 1C shows the relationship between the grain sizes of the martensite and the tempered martensite and the retention time at higher than 425° C. and lower than 600° C. In addition, FIG. 1A to FIG. 1C also show the hydrogen embrittlement resistance at that time.

As shown in FIG. 1A to FIG. 1C, when the retention time is shorter than 250 seconds, neither ferritic transformation nor bainitic transformation proceed in the surface layer, and untransformed austenite turns into martensite and tempered martensite after final cooling. Therefore, not only the volume percentages of the martensite and the tempered martensite increase, but the grain sizes thereof also increase. As a result, it becomes impossible to obtain the above-described surface layer microstructure, and the hydrogen embrittlement resistance deteriorates. Therefore, the lower limit of the retention time at higher than 425° C. and lower than 600° C. in the holding step is set to 250 seconds or longer. The retention time is preferably 300 seconds or longer and more preferably 350 seconds or longer. In the steel sheet according to the present embodiment, the Si content is limited from the viewpoint of the plating adhesion, and it is difficult to obtain a decarburized layer on the surface layer. However, when the cold-rolled steel sheet is held in the temperature range of higher than 425° C. and lower than 600° C. for a retention time of 250 seconds or longer, it is possible to cause bainitic transformation only in the surface layer area.

On the other hand, when the retention time is long, ferritic transformation and bainitic transformation occur even at the ¼ position of the sheet thickness from the surface, a desired microstructure cannot be obtained, the strength of the steel sheet decreases, and the ratio (R/t) of the limit bend radius R in 90° V-bending to the sheet thickness t deteriorates. Therefore, the upper limit of the retention time at higher than 425° C. and lower than 600° C. is set to 750 seconds or shorter. The retention time is preferably 650 seconds or shorter and more preferably 550 seconds or shorter. In the holding step, the atmosphere in the furnace is preferably set to a reducing atmosphere from the viewpoint of the chemical convertibility or the plating adhesion of the steel sheet.

[Hot-Dip Galvanizing Step]
[Alloying Step]

In the case of manufacturing a cold-rolled steel sheet including a hot-dip galvanizing on the surface (hot-dip galvanized steel sheet), the cold-rolled steel sheet may be immersed in a hot-dip plating bath during the holding step to carry out hot-dip galvanizing. In addition, in the case of manufacturing a cold-rolled steel sheet including a hot-dip galvannealing on the surface (galvannealed steel sheet), the hot-dip galvanizing may be turned into a hot-dip galvannealing by carrying out an alloying treatment subsequent to the hot-dip galvanizing step.

[Second Cooling Step]
[Tempering Step]

The cold-rolled steel sheet after the holding step is cooled to a temperature of 50° C. or higher and 250° C. or lower (second cooling step), whereby untransformed austenite is transformed into martensite. In the second cooling step, the cold-rolled steel sheet is preferably cooled at an average cooling rate of 5° C./s or faster in order to suppress bainitic transformation during cooling. The average cooling rate is more preferably 10° C./s or faster. After that, the cold-rolled steel sheet is tempered at a temperature of 200° C. or higher and 350° C. or lower for one second or longer (tempering step), thereby obtaining a tempered martensite-dominant microstructure at the ¼ position of the sheet thickness from the surface.

In a case where the hot-dip galvanizing step and/or the alloying step are carried out, the cold-rolled steel sheet after the hot-dip galvanizing step or the cold-rolled steel sheet after the hot-dip galvanizing step and the alloying step is cooled to a temperature of 50° C. or higher and 250° C. or lower and then tempered at a temperature of 200° C. or higher and 350° C. or lower for one second or longer.

When the cooling stop temperature in the second cooling step is higher than 250° C., the martensitic transformation becomes insufficient, the volume percentage of non-tempered martensite increases, and the bendability deteriorates. On the other hand, when the cooling stop temperature in the second cooling step is lower than 50° C., no residual austenite remains, and the ductility deteriorates. Therefore, the cooling stop temperature is set to 50° C. or higher and 250° C. or lower. The cooling stop temperature is preferably 75° C. or higher and 225° C. or lower and more preferably 100° C. or higher and 200° C. or lower.

In the subsequent tempering step, when the tempering temperature is higher than 350° C., the strength of the steel sheet decreases. Therefore, the tempering temperature is set to 350° C. or lower. The tempering temperature is preferably 330° C. or lower and more preferably 310° C. or lower.

On the other hand when the tempering temperature is lower than 200° C., the tempering becomes insufficient, and the bendability deteriorates. Therefore, the tempering temperature is set to 200° C. or higher. The tempering temperature is preferably 250° C. or higher, more preferably 260° C. or higher, and still more preferably 270° C. or higher.

The tempering time needs to be one second or longer and is preferably five seconds or longer and more preferably 10 seconds or longer in order to carry out a stable tempering treatment. On the other hand, there is a case where long tempering decreases the strength of the steel sheet, and thus the tempering time is preferably 90 seconds or shorter and more preferably 60 seconds or shorter.

[Third Cooling Step]
[Skin Pass Step]

The cold-rolled steel sheet after the tempering step is cooled to a temperature at which skin pass rolling is possible (third cooling step) and then subjected to skin pass rolling (skin pass step). In a case where the cooling after the annealing (the first cooling step) is water spray cooling, dip cooling, air-water cooling, or the like in which water is used, it is preferable to carry out pickling and, subsequently, plating of a small amount of one or more of Ni, Fe, Co, Sn, and Cu before the skin pass rolling in order to remove an oxide film formed by the contact with water at high temperature and improve the chemical convertibility of the steel sheet. Here the small amount means an amount of the plating of approximately 3 to 30 mg/m$^2$ on the surface of the steel sheet.

The shape of the steel sheet can be straightened by the skin pass rolling. The elongation percentage of the skin pass rolling is preferably 0.1% or more. The elongation percentage is more preferably 0.2% or more and still more preferably 0.3% or more. On the other hand, when the elongation percentage of the skin pass rolling is high, the volume percentage of the residual austenite decreases, and the ductility deteriorates. Therefore, the elongation percentage is preferably set to 1.0% or less. The elongation percentage is more preferably 0.8% or less, still more preferably 0.6% or less, and far still more preferably 0.5% or less.

EXAMPLES

The present invention will be described more specifically with reference to examples. Slabs having a chemical composition shown in Table 1 were cast. The cast slabs were heated to 1,100° C. or higher, hot-rolled to 2.8 mm such that the finish rolling outlet temperature was controlled to the Ar3 transformation point or higher, coiled at 500° C. or higher and 650° C. or lower, and then cooled to room temperature.

After that, scale was removed by pickling, and the cast slabs were cold-rolled to 1.4 mm and then annealed at soaking temperatures shown in Table 2A for 120 seconds. In the annealing, the atmosphere in the furnace during the heating and the soaking was set to a nitrogen-hydrogen mixed atmosphere having a dew point of −20° C. or higher and 20° C. or lower and including 1.0 vol % or more and 20 vol % or less of hydrogen and nitrogen. The heating speed from 700° C. to the soaking temperature during the heating for the annealing was set to slower than 5.0° C./s.

After the annealing, the cast slabs were cooled to temperatures shown in Table 2A at 10° C./s and then retained between higher than 425° C. and lower than 600° C. On some of the examples, hot-dip galvanizing and alloying were carried out during the holding. In Table 2C, CR indicates cold-rolled steel sheets on which galvanizing was not carried out. GI indicates hot-dip galvanized steel sheets, and GA indicates galvannealed steel sheets. The galvannealed steel sheets were subjected to hot-dip galvanizing of approximately 35 to 65 g/m² and then alloyed at a temperature of lower than 600° C. In the present examples, the temperatures during the retention time at higher than 425° C. and lower than 600° C. were set to be constant; however, as described above, the temperatures may be changed during the retention time as long as the temperatures are within this temperature range.

After the holding, the cast slabs were cooled to 50° C. or higher and 250° C. or lower at 10° C./s or faster, subjected to a heat treatment for tempering for 1 second to 90 seconds, and then cooled to 50° C., thereafter 0.1% or more of skin pass rolling was carried out. The tempering temperatures were set to 250° C. to 350° C. for Test Numbers 1 to 33 and to 200° C. for Test Number 34.

For the cold-rolled steel sheets of Test Numbers 22, 23, and 30, before the skin pass rolling, the surfaces of the steel sheets were pickled and then plated with approximately 3 to 30 mg/m² of Ni.

The tensile strength (TS) and the uniform elongation (uEl) were obtained by collecting JIS No. 5 tensile test pieces from the annealed steel sheets in a direction perpendicular to the rolling direction and carrying out tensile tests according to JIS Z 2241 (2011).

In addition, the following test was carried out for the evaluation of the hydrogen embrittlement resistance. That is, a delayed fracture promoting test was carried out as follows: a test piece having a mechanically ground end surface was bent into a U shape by a pressing bend method to produce a U-bent test piece having a radius of 5R, the U-bent test piece was elastically deformed by fastening the unbent parts with a bolt so as to be parallel to each other, and then the U-bent test piece was immersed in hydrochloric acid having a pH of 1 to cause hydrogen to infiltrate into the steel sheet. Steel sheets that did not crack even after the immersion time reached 100 hours were evaluated as a steel sheet having a favorable (OK) delayed fracture resistance property, and steel sheets that cracked were evaluated as poor (NG). In order to remove the influence of plating, regarding plating materials, the plated layer was removed with hydrochloric acid containing an inhibitor before the test, and then the hydrogen embrittlement resistance was evaluated.

The limit bend radius (R/t) was obtained by obtaining the minimum bending R, at which cracking did not occur, by changing the radius R at 0.5 mm pitches using a 90 V-bending die and dividing the minimum bending by a sheet thickness of 1.4 mm.

From the obtained annealed steel sheets (cold-rolled steel sheets), test pieces for SEM observation were collected as described above, and the longitudinal sections parallel to the rolling direction were polished. Then, the metallographic structures at the 25 μm positions from the surfaces of the steel sheets and at the ¼ positions of the sheet thicknesses were observed, and the volume percentages of individual microstructures were measured by image processing. In addition, test pieces for X-ray diffraction were collected, and the volume percentages of residual austenite were measured by X-ray diffraction on the surfaces chemically polished up to the ¼ thickness from the surface layer as described above. In addition, the average grain sizes of martensite and tempered martensite at the 25 μm depth position from the surfaces of the steel sheets were measured.

TABLE 1

| | Chemical composition (mass %) (remainder; Fe and impurities) | | | | | | | |
|---|---|---|---|---|---|---|---|---|
| Steel | C | Si | Mn | P | S | Al | N | Other |
| A | 0.132 | 0.42 | 1.82 | 0.008 | 0.001 | 0.034 | 0.0028 | |
| B | 0.224 | 0.31 | 2.45 | 0.009 | 0.001 | 0.028 | 0.0030 | |
| C | 0.237 | 0.99 | 1.46 | 0.010 | 0.001 | 0.032 | 0.0030 | |
| D | 0.406 | 0.41 | 3.87 | 0.008 | 0.001 | 0.035 | 0.0031 | |
| E | 0.223 | 1.55 | 1.88 | 0.009 | 0.001 | 0.032 | 0.0033 | |
| F | 0.323 | 0.81 | 4.06 | 0.010 | 0.001 | 0.029 | 0.0031 | |
| G | 0.226 | 0.75 | 2.13 | 0.008 | 0.001 | 0.121 | 0.0029 | |
| H | 0.236 | 0.72 | 2.65 | 0.009 | 0.001 | 0.031 | 0.0032 | |
| I | 0.246 | 0.73 | 2.56 | 0.008 | 0.001 | 0.032 | 0.0033 | |
| J | 0.223 | 0.74 | 2.61 | 0.008 | 0.001 | 0.030 | 0.0030 | |
| K | 0.168 | 0.77 | 3.25 | 0.008 | 0.001 | 0.032 | 0.0027 | |
| L | 0.226 | 0.75 | 2.46 | 0.010 | 0.001 | 0.027 | 0.0031 | V: 0.11 |
| M | 0.246 | 0.76 | 2.51 | 0.010 | 0.001 | 0.041 | 0.0037 | Ti: 0.025 Nb: 0.009 B: 0.0018 |
| N | 0.356 | 0.77 | 1.78 | 0.008 | 0.001 | 0.030 | 0.0032 | Mo: 0.09 Cr: 0.29 |
| O | 0.231 | 0.75 | 2.56 | 0.010 | 0.001 | 0.030 | 0.0035 | Bi: 0.008 REM: 0.0010 |
| P | 0.225 | 0.76 | 2.44 | 0.010 | 0.001 | 0.029 | 0.0032 | Ca: 0.008 Mg: 0.00010 |

TABLE 2A

| | | Annealing conditions in continuous annealing line | | |
|---|---|---|---|---|
| Test Number | Steel | Soaking temperature (° C.) | Holding temperature (° C.) | Retention time at holding temperature shown left (s) |
| 1 | A | 805 | 495 | 460 |
| 2 | B | 820 | 483 | 330 |
| 3 | C | 830 | 495 | 460 |
| 4 | D | 820 | 506 | 460 |
| 5 | E | 830 | 470 | 440 |
| 6 | F | 825 | 502 | 460 |
| 7 | G | 820 | 554 | 460 |
| 8 | H | 840 | 497 | 460 |
| 9 | H | 790 | 532 | 400 |

TABLE 2A-continued

Annealing conditions in continuous annealing line

| Test Number | Steel | Soaking temperature (° C.) | Holding temperature (° C.) | Retention time at holding temperature shown left (s) |
|---|---|---|---|---|
| 10 | H | 850 | 420 | 260 |
| 11 | H | 840 | 615 | 320 |
| 12 | H | 850 | 507 | 50 |
| 13 | H | 850 | 508 | 235 |
| 14 | H | 845 | 492 | 800 |
| 15 | H | 860 | 502 | 260 |
| 16 | H | 805 | 563 | 420 |
| 17 | H | 820 | 508 | 370 |
| 18 | H | 812 | 512 | 680 |
| 19 | H | 850 | 540 | 340 |
| 20 | H | 850 | 512 | 570 |
| 21 | H | 850 | 445 | 355 |
| 22 | H | 850 | 472 | 360 |
| 23 | H | 810 | 581 | 430 |
| 24 | I | 850 | 496 | 440 |
| 25 | J | 840 | 528 | 360 |
| 26 | K | 835 | 448 | 340 |
| 27 | L | 840 | 489 | 460 |
| 28 | M | 845 | 501 | 460 |
| 29 | M | 850 | 503 | 420 |
| 30 | N | 820 | 575 | 720 |
| 31 | O | 820 | 512 | 400 |
| 32 | O | 850 | 498 | 480 |
| 33 | P | 845 | 503 | 460 |
| 34 | P | 845 | 500 | 460 |

TABLE 2B

Metallographic structure of cold-rolled steel sheet (% is volume percentage)

| | | ¼ thickness | | | | | | Surface layer 25 μm | | | | |
|---|---|---|---|---|---|---|---|---|---|---|---|---|
| Test Number | Steel | Ferrite (%) | Bainite (%) | Total of ferrite and bainite (%) | Residual austenite (%) | Martensite (%) | Tempered martensite (%) | Remainder (%) | Ferrite (%) | Bainite (%) | Total of ferrite and bainite (%) | Total of martensite and tempered martensite (%) | Average grain size of martensite and tempered martensite (μm) |
| 1 | A | 15.1 | 15.3 | 30.4 | 3.4 | 0.0 | 66.2 | 0.0 | 76.8 | 11.6 | 88.4 | 12 | 3.6 |
| 2 | B | 0.0 | 7.2 | 7.2 | 2.9 | 0.0 | 89.9 | 0.0 | 12.6 | 43.1 | 55.7 | 44 | 7.1 |
| 3 | C | 0.0 | 26.2 | 26.2 | 5.6 | 0.0 | 68.2 | 0.0 | 21.2 | 58.3 | 79.5 | 21 | 4.2 |
| 4 | D | 0.0 | 0.0 | 0.0 | 7.9 | 5.6 | 86.5 | 0.0 | 19.7 | 21.4 | 41.1 | 59 | 9.5 |
| 5 | E | 23.1 | 39.6 | 62.7 | 10.3 | 8.3 | 18.7 | 0.0 | 58.3 | 32.2 | 90.5 | 10 | 3.7 |
| 6 | F | 0.0 | 0.0 | 0.0 | 6.2 | 5.1 | 88.7 | 0.0 | 23.4 | 25.6 | 49.0 | 51 | 7.8 |
| 7 | G | 27.6 | 0.0 | 27.6 | 6.5 | 0.0 | 65.9 | 0.0 | 55.4 | 29.1 | 84.5 | 16 | 3.6 |
| 8 | H | 0.0 | 9.6 | 9.6 | 5.1 | 0.0 | 85.3 | 0.0 | 29.0 | 55.0 | 84.0 | 18 | 3.6 |
| 9 | H | 25.4 | 0.0 | 25.4 | 6.1 | 1.5 | 67.0 | 0.0 | 59.6 | 28.1 | 87.7 | 12 | 3.5 |
| 10 | H | 0.0 | 26.4 | 26.4 | 6.3 | 1.6 | 65.7 | 0.0 | 3.0 | 71.7 | 74.7 | 25 | 4.6 |
| 11 | H | 25.6 | 0.0 | 25.6 | 6.2 | 1.7 | 61.0 | 5.5 | 61.2 | 3.0 | 64.2 | 36 | 6.3 |
| 12 | H | 0.0 | 1.0 | 1.0 | 5.4 | 0.0 | 93.6 | 0.0 | 19.6 | 37.3 | 56.9 | 43 | 7.4 |
| 13 | H | 0.0 | 3.0 | 3.0 | 5.3 | 0.0 | 91.7 | 0.0 | 22.6 | 45.5 | 68.1 | 32 | 5.2 |
| 14 | H | 0.0 | 25.6 | 25.6 | 5.2 | 0.0 | 69.2 | 0.0 | 31.5 | 53.4 | 84.9 | 13 | 3.8 |
| 15 | H | 0.0 | 4.0 | 4.0 | 5.0 | 0.0 | 91.0 | 0.0 | 25.3 | 46.8 | 72.1 | 28 | 4.8 |
| 16 | H | 10.4 | 0.0 | 10.4 | 5.2 | 0.0 | 83.0 | 1.4 | 47.4 | 30.4 | 77.8 | 22 | 4.4 |
| 17 | H | 3.9 | 4.7 | 8.6 | 5.5 | 0.0 | 84.9 | 1.0 | 31.3 | 51.7 | 83.0 | 17 | 3.9 |
| 18 | H | 4.6 | 12.8 | 17.4 | 5.6 | 0.0 | 77.0 | 0.0 | 35.7 | 48.9 | 84.6 | 15 | 3.8 |
| 19 | H | 0.0 | 0.0 | 0.0 | 5.2 | 0.0 | 94.8 | 0.0 | 43.2 | 33.1 | 76.3 | 24 | 4.2 |
| 20 | H | 0.0 | 11.7 | 11.7 | 6.1 | 0.0 | 82.2 | 0.0 | 31.8 | 54.0 | 85.8 | 14 | 3.8 |
| 21 | H | 0.0 | 15.2 | 15.2 | 5.2 | 0.0 | 79.6 | 0.0 | 7.6 | 77.6 | 85.2 | 15 | 3.7 |
| 22 | H | 0.0 | 10.5 | 10.5 | 5.4 | 0.0 | 84.1 | 0.0 | 10.9 | 74.2 | 85.1 | 15 | 3.6 |
| 23 | H | 12.6 | 0.0 | 12.6 | 5.2 | 0.0 | 79.9 | 2.3 | 50.3 | 24.0 | 74.3 | 26 | 4.8 |
| 24 | I | 0.0 | 9.3 | 9.3 | 5.6 | 0.0 | 85.1 | 0.0 | 32.2 | 53.3 | 85.5 | 15 | 3.8 |
| 25 | J | 0.0 | 0.0 | 0.0 | 5.4 | 0.0 | 94.6 | 0.0 | 40.9 | 40.1 | 81.0 | 19 | 3.9 |
| 26 | K | 0.0 | 9.4 | 9.4 | 5.8 | 0.0 | 84.8 | 0.0 | 13.4 | 59.3 | 72.7 | 27 | 4.7 |
| 27 | L | 0.0 | 9.9 | 9.9 | 5.8 | 0.0 | 84.3 | 0.0 | 30.5 | 53.2 | 83.7 | 16 | 3.8 |
| 28 | M | 0.0 | 9.8 | 9.8 | 5.5 | 0.0 | 84.7 | 0.0 | 31.7 | 52.9 | 84.6 | 15 | 3.7 |
| 29 | M | 0.0 | 9.2 | 9.2 | 5.6 | 0.0 | 85.2 | 0.0 | 31.0 | 53.4 | 84.4 | 16 | 3.6 |
| 30 | N | 8.7 | 0.0 | 8.7 | 7.6 | 3.4 | 79.3 | 1.0 | 57.1 | 25.2 | 82.3 | 18 | 3.8 |
| 31 | O | 3.6 | 6.3 | 9.9 | 5.5 | 0.0 | 84.6 | 0.0 | 29.9 | 53.1 | 83.0 | 17 | 3.7 |
| 32 | O | 0.0 | 8.6 | 8.6 | 5.5 | 0.0 | 86.0 | 0.0 | 30.6 | 52.4 | 83.0 | 17 | 3.6 |
| 33 | P | 0.0 | 9.8 | 9.8 | 5.8 | 0.0 | 84.4 | 0.0 | 31.4 | 52.0 | 83.4 | 17 | 3.6 |
| 34 | P | 0.0 | 9.7 | 9.7 | 5.7 | 0.8 | 83.8 | 0.0 | 31.2 | 51.3 | 82.5 | 17 | 3.7 |

TABLE 2C

| Test Number | Steel | Presence or absence of plating[2] | TS (MPa) | Uniform elongation (%) | Limit bend radius[1] (R/t) | Hydrogen embrittlement resistance | Note |
|---|---|---|---|---|---|---|---|
| 1 | A | CR | 1194 | 5.4 | 5.4 | OK | Comparative Example |
| 2 | B | CR | 1556 | 4.9 | 4.6 | NG | Comparative Example |
| 3 | C | CR | 1307 | 7.5 | 5.4 | OK | Comparative Example |
| 4 | D | CR | 1977 | 6.5 | 6.4 | NG | Comparative Example |
| 5 | E | CR | 869 | 17.2 | 5.4 | OK | Comparative Example |
| 6 | F | GA | 1619 | 6.5 | 6.8 | NG | Comparative Example |
| 7 | G | CR | 1297 | 8.2 | 3.9 | OK | Comparative Example |
| 8 | H | CR | 1488 | 6.1 | 2.5 | OK | Example |
| 9 | H | CR | 1301 | 7.8 | 5.4 | OK | Comparative Example |
| 10 | H | CR | 1287 | 8.1 | 5.4 | OK | Comparative Example |
| 11 | H | GA | 1241 | 8.3 | 5.4 | OK | Comparative Example |
| 12 | H | CR | 1582 | 6.0 | 3.2 | NG | Comparative Example |
| 13 | H | CR | 1562 | 6.0 | 2.5 | NG | Comparative Example |
| 14 | H | CR | 1303 | 7.0 | 5.4 | OK | Comparative Example |
| 15 | H | CR | 1563 | 5.9 | 2.5 | OK | Example |
| 16 | H | GA | 1448 | 6.4 | 2.9 | OK | Example |
| 17 | H | CR | 1482 | 6.5 | 2.5 | OK | Example |
| 18 | H | GA | 1387 | 7.0 | 2.9 | OK | Example |
| 19 | H | CR | 1591 | 5.8 | 2.1 | OK | Example |
| 20 | H | CR | 1445 | 7.2 | 2.9 | OK | Example |
| 21 | H | GA | 1421 | 6.7 | 2.9 | OK | Example |
| 22 | H | CR | 1461 | 6.6 | 2.5 | OK | Example |
| 23 | H | CR | 1420 | 6.6 | 2.9 | OK | Example |
| 24 | I | CR | 1481 | 6.6 | 2.5 | OK | Example |
| 25 | J | GA | 1584 | 6.0 | 2.1 | OK | Example |
| 26 | K | CR | 1357 | 7.3 | 2.1 | OK | Example |
| 27 | L | CR | 1472 | 6.8 | 2.5 | OK | Example |
| 28 | M | GA | 1478 | 6.5 | 2.5 | OK | Example |
| 29 | M | CR | 1483 | 6.5 | 2.5 | OK | Example |
| 30 | N | CR | 1848 | 6.7 | 4.6 | OK | Example |
| 31 | O | GA | 1478 | 6.5 | 2.5 | OK | Example |
| 32 | O | CR | 1495 | 6.4 | 2.5 | OK | Example |
| 33 | P | GA | 1474 | 6.7 | 2.5 | OK | Example |
| 34 | P | GI | 1492 | 6.4 | 2.6 | OK | Example |

[1] The limit bend radius is a value obtained by dividing the bend radius R at which cracking occurs in 90° V-bending by the sheet thickness t
[2] CR indicates non-plated materials, GA indicates hot-dip galvannealing, and GI indicates hot-dip galvanizing Table 2B and Table 2C show the observation results of the metallographic structures and the investigation results of the mechanical characteristics of the annealed steel sheets. In all of the present invention steels, TS is 1,310 MPa or more, uEl is 5.0% or more, the limit bend radius (R/t) is 5.0 or less, and the hydrogen embrittlement resistance is also favorable.

In contrast, in the test numbers (comparative example) in which any of the chemical composition and the manufacturing method was outside the scope of the present invention and the microstructure was outside the scope of the present invention, any one or more of the tensile strength, the uniform elongation, the limit bend radius, and the hydrogen embrittlement resistance failed to achieve the target. Particularly, in Test Number 5, the Si content was large, and thus the volume percentage of ferrite increased, and the volume percentage of tempered martensite decreased. As a result, the tensile strength was low, and the limit bend radius (R/t) was poor. In the present invention examples, the metallographic structure at the sheet thickness ¼ position from the surface of the steel sheet was controlled by appropriately controlling the heat treatment conditions during the annealing while suppressing the Si content, thereby achieving both the hydrogen embrittlement resistance and the tensile strength.

INDUSTRIAL APPLICABILITY

According to the present invention, a high-strength cold-rolled steel sheet in which the tensile strength (TS) is 1,310 MPa or more, the uniform elongation is 5.0% or more, the ratio (R/t) of the limit bend radius R in 90° V-bending to the sheet thickness t is 5.0 or less, and, furthermore, the hydrogen embrittlement resistance is excellent, and a manufacturing method therefor can be obtained. Such a steel sheet has formability favorable enough to be applied to working such as press forming and is excellent in terms of the hydrogen embrittlement resistance, which is a problem in relation to high-strengthening. Therefore, the present invention is capable of contributing to solving the global environmental issue by reducing the vehicle body weights of vehicles and significantly contributes to industrial development.

What is claimed is:

1. A high-strength cold-rolled steel sheet having a chemical composition containing, by mass %:
C: more than 0.140% and less than 0.400%,
Si: more than 0.35% and less than 1.50%,
Mn: more than 1.50% and less than 4.00%,
P: 0.100% or less,
S: 0.010% or less,
Al: 0.100% or less,
N: 0.0100% or less,
Ti: 0% or more and less than 0.050%,
Nb: 0% or more and less than 0.050%,
V: 0% or more and 0.50% or less,
Cr: 0% or more and 1.00% or less,
Mo: 0% or more and 0.50% or less,
B: 0% or more and 0.0100% or less,
Ca: 0% or more and 0.0100% or less,
Mg: 0% or more and 0.0100% or less,
REM: 0% or more and 0.0500% or less, and
Bi: 0% or more and 0.050% or less,
with a remainder of Fe and impurities,
wherein a microstructure at a ¼ position of a sheet thickness from a surface includes, by a volume percentage,
70.0% or more of tempered martensite,
more than 3.0% and less than 10.0% of residual austenite,
a total of 25.0% or less of ferrite and bainite, and
5.0% or less of martensite,
a microstructure at a position 25 μm from the surface includes, by the volume percentage,
a total of 70% or more of ferrite and bainite, and
a total of more than 0% and 30% or less of martensite and tempered martensite,
an average grain size of the martensite and the tempered martensite at the position 25 μm from the surface is 5.0 μm or less,
a tensile strength is 1,310 MPa or more, a uniform elongation is 5.0% or more, and R/t is 5.0 or less, the R/t being a ratio of a limit bend radius R in 90° V-bending to a sheet thickness t.

2. The high-strength cold-rolled steel sheet according to claim 1,
wherein the chemical composition contains one or more of, by mass %:
Ti: 0.001% or more and less than 0.050%,
Nb: 0.001% or more and less than 0.050%,
V: 0.01% or more and 0.50% or less,
Cr: 0.01% or more and 1.00% or less,
Mo: 0.01% or more and 0.50% or less,
B: 0.0001% or more and 0.0100% or less,
Ca: 0.0001% or more and 0.0100% or less,
Mg: 0.0001% or more and 0.0100% or less,
REM: 0.005% or more and 0.0500% or less, and
Bi: 0.005% or more and 0.050% or less.

3. The high-strength cold-rolled steel sheet according to claim 2, comprising:
a hot-dip galvanized layer on the surface.

4. The high-strength cold-rolled steel sheet according to claim 3,
wherein the hot-dip galvanized layer is a hot-dip galvannealed layer.

5. The high-strength cold-rolled steel sheet according to claim 1, comprising:
a hot-dip galvanized layer on the surface.

6. The high-strength cold-rolled steel sheet according to claim 5,
wherein the hot-dip galvanized layer is a hot-dip galvannealed layer.

7. A manufacturing method for a high-strength cold-rolled steel sheet according to claim 1, the method comprising:
directly heating or cooling and then heating a cast slab having a chemical composition containing, by mass %, C: more than 0.140% and less than 0.400%, Si: more than 0.35% and less than 1.50%, Mn: more than 1.50% and less than 4.00%, P: 0.100% or less, S: 0.010% or less, Al: 0.100% or less and N: 0.0100% or less, Ti: 0% or more and less than 0.050%, Nb: 0% or more and less than 0.050%, V: 0% or more and 0.50% or less, Cr: 0% or more and 1.00% or less, Mo: 0% or more and 0.50% or less, B: 0% or more and 0.0100% or less, Ca: 0% or more and 0.0100% or less, Mg: 0% or more and 0.0100% or less, REM: 0% or more and 0.0500% or less, Bi: 0% or more and 0.050% or less with a remainder of Fe and impurities and hot rolling the cast slab to produce a hot-rolled steel sheet;
pickling and cold rolling the hot-rolled steel sheet to obtain a cold-rolled steel sheet;
carrying out annealing by soaking the cold-rolled steel sheet in an atmosphere having a dew point of −20° C. or higher and 20° C. or lower and containing nitrogen and 1.0 vol % or more and 20 vol % or less of hydrogen at a temperature of 800° C. or higher;
first cooling the cold-rolled steel sheet to a temperature range of higher than 425° C. and lower than 600° C. after the annealing;
holding the cold-rolled steel sheet in a temperature range of higher than 425° C. and lower than 600° C. for 250 seconds or longer and 750 seconds or shorter after the first cooling;
second cooling the cold-rolled steel sheet to a temperature of 50° C. or higher and 250° C. or lower after the holding;
tempering the cold-rolled steel sheet at a temperature of 250° C. or higher and 350° C. or lower for one second or longer after the second cooling;
third cooling the cold-rolled steel sheet to a temperature at which skin pass rolling is possible after the tempering; and
carrying out the skin pass rolling on the cold-rolled steel sheet after the third cooling.

8. The manufacturing method for a high-strength cold-rolled steel sheet according to claim 7,
wherein the chemical composition contains, by mass %, one or more of Ti: 0.001% or more and less than 0.050%, Nb: 0.001% or more and less than 0.050%, V: 0.01% or more and 0.50% or less, Cr: 0.01% or more and 1.00% or less, Mo: 0.01% or more and 0.50% or less, B: 0.0001% or more and 0.0100% or less, Ca: 0.0001% or more and 0.0100% or less, Mg: 0.0001% or more and 0.0100% or less, REM: 0.005% or more and 0.0500% or less, and Bi: 0.005% or more and 0.050% or less.

9. The manufacturing method for a high-strength cold-rolled steel sheet according to claim 8,
wherein the holding includes hot-dip galvanizing of the cold-rolled steel sheet.

10. The manufacturing method for a high-strength cold-rolled steel sheet according to claim 9, further comprising:
carrying out an alloying treatment after the hot-dip galvanizing in the holding.

11. The manufacturing method for a high-strength cold-rolled steel sheet according to claim 7,
wherein the holding includes hot-dip galvanizing of the cold-rolled steel sheet.

12. The manufacturing method for a high-strength cold-rolled steel sheet according to claim 11, further comprising:
carrying out an alloying treatment after the hot-dip galvanizing in the holding.

\* \* \* \* \*